United States Patent
Höök et al.

(10) Patent No.: US 6,363,425 B1
(45) Date of Patent: Mar. 26, 2002

(54) DIGITAL TELECOMMUNICATION SYSTEM WITH SELECTED COMBINATION OF CODING SCHEMES AND DESIGNATED RESOURCES FOR PACKET TRANSMISSION BASED ON ESTIMATED TRANSMISSION TIME

(75) Inventors: Mikael Höök, Sollentuna; Johan Nyström, Stockholm, both of (SE)

(73) Assignee: Telefonaktiebolaget L M Ericsson, Stockholm (SE)

(*) Notice: Subject to any disclaimer, the term of this patent is extended or adjusted under 35 U.S.C. 154(b) by 0 days.

(21) Appl. No.: 09/130,599

(22) Filed: Aug. 7, 1998

(30) Foreign Application Priority Data

Aug. 8, 1997 (SE) .............................................. 9702903

(51) Int. Cl.⁷ .......................................... G06F 15/173
(52) U.S. Cl. ..................... 709/226; 709/102; 709/104; 709/201; 709/225; 709/229; 714/746; 714/748
(58) Field of Search ................................ 709/201, 211, 709/226, 229, 102, 104, 225; 714/746, 748

(56) References Cited

U.S. PATENT DOCUMENTS

| | | | | |
|---|---|---|---|---|
| 4,271,520 A | * | 6/1981 | Coombes et al. | 714/775 |
| 4,317,195 A | * | 2/1982 | Barberis et al. | 370/94 |
| 5,526,399 A | | 6/1996 | Kameda | 379/58 |
| 5,596,604 A | | 1/1997 | Cioffi et al. | 345/260 |
| 5,931,964 A | * | 8/1999 | Beming et al. | 714/748 |
| 6,134,220 A | * | 10/2000 | Le Strat et al. | 370/252 |

FOREIGN PATENT DOCUMENTS

| | | |
|---|---|---|
| EP | 0777354 A2 | 6/1997 |
| JP | 09070071 A | 3/1997 |
| SE | 504577 C2 | 3/1997 |
| WO | WO 9636146 A1 | 11/1996 |

OTHER PUBLICATIONS

Gjervaldsaeter, Peder, PCT International–Type Search Report, May 18, 1998, Search Request No. SE/97/01053, pp. 1–3.
Malkamäki, Esa; "Speech Transmission with Burst–by–Burst ARQ;" Race Mobile Telecommunication Workshop, Metz, Jun. 1993, pp. 475–479.
Godlewski, Philippe, and Lagrange, Xavier; "A Hybrid Error Control Scheme for Short Block Transmission;" pp. 111–115.
Malkamäki, Esa; "Performance of the burst–level ARQ error protection schemein an indoor mobil radio environment;"; Mar. 1994; pp. 1412–1416.

* cited by examiner

Primary Examiner—John A. Follansbee
Assistant Examiner—Nabil El-Hady
(74) Attorney, Agent, or Firm—Jenkens & Gilchrist, P.C.

(57) ABSTRACT

The present invention relates to a method and an arrangement for communicating packet information in a digital telecommunications system. Through the invention is selected a set of designated communication resources (ch1–chn) from an available amount of resources. Every packet (P) is forward error correction encoded into an encoded packet ($P_{ci}$), via one of at least two different coding schemes ($c_i$), prior to being transmitted to a receiving party, over the designated communication resources (ch1-chn). An estimated transmission time is calculated for all combinations of coding scheme ($c_i$) and relevant distribution ($d_j$) of the encoded data blocks ($B_1$–$B_\Gamma$), in the encoded packet ($P_{ci}$) over the set of designated communication resources (ch1-chn), and the combination ($c_i$,$d_j$) is selected, which minimises the estimated transmission time.

25 Claims, 5 Drawing Sheets

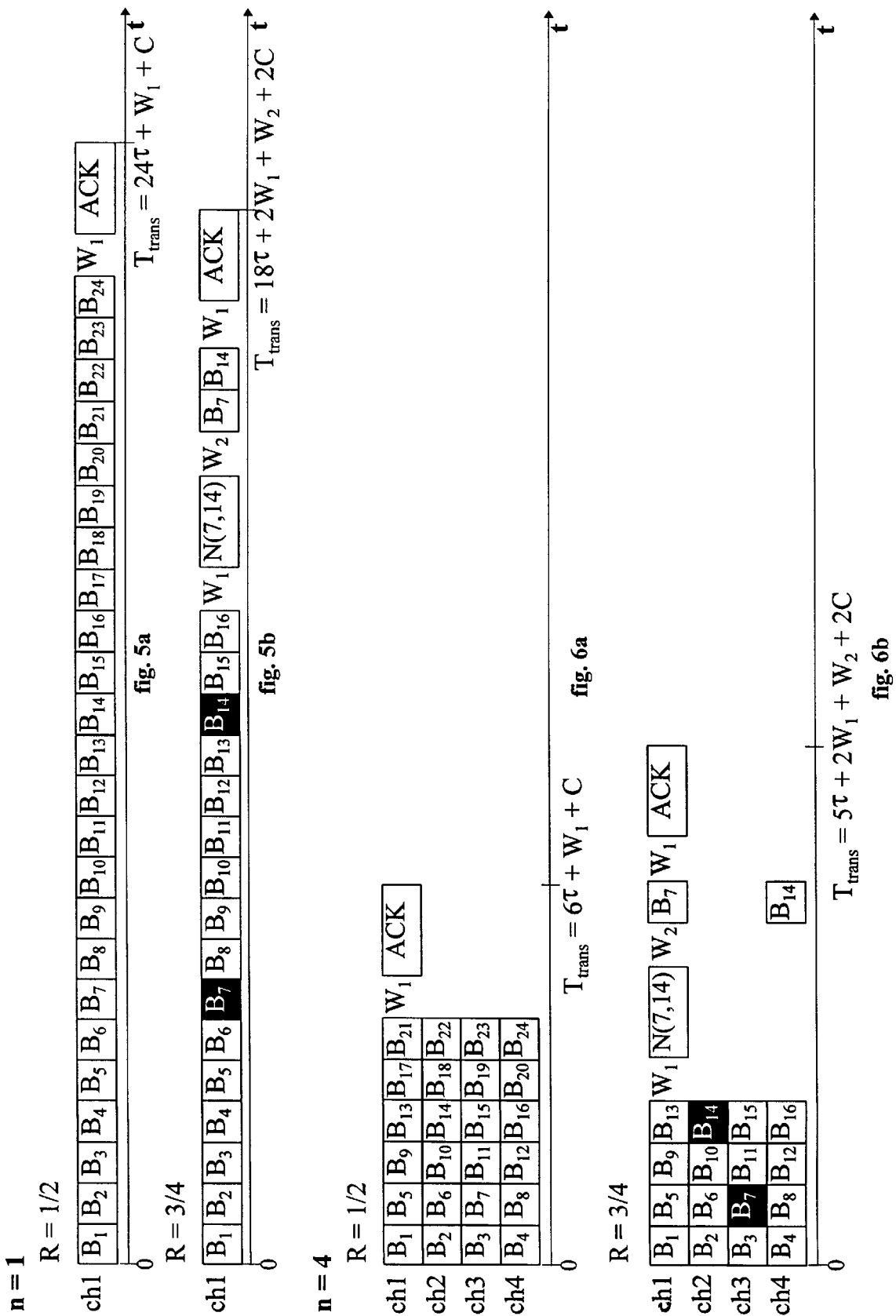

DIGITAL TELECOMMUNICATION SYSTEM WITH SELECTED COMBINATION OF CODING SCHEMES AND DESIGNATED RESOURCES FOR PACKET TRANSMISSION BASED ON ESTIMATED TRANSMISSION TIME

TECHNICAL FIELD

The present invention relates to a method for communicating forward error correction (FEC) encoded packet information in a digital telecommunications system, wherein the amount of communication resources is variable for each transmission of information and wherein erroneously received packets may be selectively re-transmitted. Through the inventive method the estimated total time for communicating packets from a transmitting party to a receiving party is minimised.

The invention is also directed to an arrangement for performing the above mentioned method.

The invention is particularly suitable for use in a GPRS system (GPRS=General Packet Radio Service), standardised within GSM (GSM=Global System for Mobile telecommunication).

STATE OF THE ART

A packet is defined as an amount of information, which can be sent from a transmitting party to a receiving party over one or more communication resources. A communication resource is typically a channel and may, for instance, be a particular carrier frequency in a FDMA system (FDMA= Frequency Division Multiple Access), a particular time slot in a TDMA system (TDMA =Time Division Multiple Access), a particular code or signature sequence in a CDMA system (CDMA=Code Division Multiple Access), a particular sub-channel carrier in an OFDM system (OFDM= Orthogonal Frequency Division Multiplex) or a certain wavelength in a WDMA system (Wavelength Division Multiple Access). Normally, each packet is segmented into a number of data blocks. A very short packet may be fitted into a single data block, but in most cases a packet corresponds to two or more data blocks.

A packet can further be defined differently on different logical levels in a telecommunications system. Hence, what is one packet on a first logical level may be considered to be several packets on a second logical level. For instance in GPRS higher level packets are usually split into two or more so called LLC frames (LLC=Link Layer Control) before transmission across the air interface. With regard to this invention such LLC frames and corresponding sub-packets are likewise considered as packets.

Moreover, before a data block is sent, redundancy symbols may be included in the data block. The redundancy symbols are correlated with the payload information in the data block, so that a limited deterioration of the data during the transmission may be corrected by the receiving party. The process of adding redundancy symbols is called forward error correction coding and is carried out in accordance with a coding scheme.

The more redundancy symbols that are included, the more transmission deterioration can be tolerated. However, the size of a data block is constant. Thus, a large amount of redundancy results in many data blocks, which of course, gives a longer transmission time than if no redundancy symbols had been added. On the other hand, a small amount of redundancy increases the probability for data block re-transmissions, due to the occurrence of unrecoverable errors during the transmission. A large number of such re-transmissions definitely leads to a long total transmission time for the information contained in the packet.

From the document U.S. Pat. No. 5,526,399 is known as method for transmitting information in a radio communications system, whereby a combination of Forward Error Correction (FEC) and Automatic Repeat reQuest (ARQ) can be used to achieve a good transmission efficiency. The number of repeat communication requests per time interval is monitored and if this number is greater than a first value, then the amount of forward error correction is increased. If instead the number of repeat communication requests per time interval is smaller than a second value the amount of forward error correction is decreased.

A method for non-transparent data transmission is disclosed in WO, A1, 96/36146. The document describes how channel coding is employed on information, which is transmitted from a first to a second party. The quality of the non-transparent connection is monitored and if the quality drops to a certain level, then the channel coding is changed to a more efficient one. In order to compensate for a lower transmission rate per channel for the payload information, during the use of the more efficient channel coding, the allocated channel capacity is simultaneously increased.

The document U.S. Pat. No. 4,939,731 discloses another example of a method, in which an increasing number of repeat communication requests is overcome by expanding the amount of redundancy in each data block in relation to the payload information. Here however, there is no compensation for the lowered payload transmission rate.

In the article "Performance of the Burst-Level ARQ Error Protection Scheme in an Indoor Mobile Radio Environment", IEEE Transactions on Vehicular Technology, No. 1, March 1994, pp 1412–1416, E. Malkamäki presents a burst-level ARQ scheme as an alternative to conventional FEC-encoding for speech transmission, where redundancy is sent only when required.

All these methods, in one way or another, adaptively set the relationship between the amount of forward error correction and the number of data block re-transmissions per time interval in order to achieve an efficient transfer of information from a transmitting party to a receiving party.

Nevertheless, none of the previously known methods a priori aims at minimising the total transmission time for the information. Instead, each method tentatively varies the amount of forward error correction to a level, which for the moment gives a satisfying throughput of the payload information.

DISCLOSURE OF THE INVENTION

An object of the present invention is thus to minimise the average transmission time for payload information in a telecommunications system.

Another object of the invention is to utilise the air interface of a radio communications system as efficiently as possible, when communicating packet information in such a system.

A further object of the invention is to provide a reliable transmission of packet information in an environment, where the transmission conditions are unstable.

These objects are met by the present invention by a priori minimising the estimated transmission time for each packet communicated through the system. Generally, the available communication resources have quite varying transmission quality. It is therefore important to make a wise selection from these resources. Depending on how many communication resources that have sufficiently high transmission quality and the quality variance between these resources, one particular coding scheme is the optimal scheme to use. Thus, it is crucial which coding scheme that is chosen in combination with the allocated communication resources. Moreover, the distribution of encoded data blocks over the allocated communication resources is a parameter, which must be optimised.

According to one embodiment of the present invention there is provided a method for communicating packet information in a digital telecommunications system. The method presupposes that the amount of communication resources is variable for each packet and that the system operates in accordance with a protocol, which admits selective re-transmission of erroneously received packets. Furthermore, it must be possible to forward error correction encode the payload information via one of at least two different coding schemes, before sending the information to a receiving party.

The method finds, for each packet and set of available communication resources, a combination of a coding scheme and a subset of resources, which minimises an estimated transmission time for the information contained in the packet. By transmission time is meant, the time from start of transmission of an initial data block in the packet, to reception of a positive acknowledgement message for the packet, i.e. including any possible intermediate delays and waiting times. Naturally, the choice of coding scheme and subset of resources may also be based upon additional premises, on condition that the above mentioned transmission time-requirement is met. After having found such an optimal combination of a coding scheme and a set of communication resources the packet is encoded via this coding scheme and transmitted to the receiving party over these resources.

According to another embodiment of the present invention there is provided a method for communicating packet information in a digital telecommunications system as defined above, through which, for each packet and set of available communication resources, there is found a combination of a coding scheme and a distribution of encoded data blocks, over a subset of the available resources.

The method comprises the following non-consecutive steps. Determining which, of all communication resources in the system, that are presently available for transmitting a particular packet; selecting from the available communication resources a designated set, which contains the most suitable resources for sending the packet; estimating a transmission time, for sending two or more encoded versions of the packet, over the designated set of resources; and selecting a combination of a coding scheme and a distribution of encoded data blocks, that minimises the estimated transmission time, for sending the encoded data blocks, which constitute an encoded version of the packet. The distribution thus defines exactly which encoded data block that shall be transmitted over which communication resource. Finally, the packet is encoded via the coding scheme of the selected combination and transmitted over the communication resources of the designated set, according to the distribution, which in combination with the selected coding scheme, is expected to be optimal from a transmitting time-point of view.

According to yet another embodiment of the present invention there is provided a method for communicating packet information in a digital telecommunications system as defined above, through which, for each packet and set of available communication resources, there is found a combination of a coding scheme and a distribution of encoded data blocks, over a subset of the available resources.

The method comprises the following consecutive steps. First, determining which, of all communication resources in the system, that are presently available for transmitting a particular packet. Second, deriving an estimated transmission quality for each of these communication resources. Third, selecting from the available resources a designated set, containing the most suitable resources for sending the packet. Fourth, selecting an arbitrary coding scheme from the coding schemes, that are available within the system. Fifth, calculating a number of encoded data blocks that would be comprised in an encoded packet, which is derived from encoding the packet via the selected coding scheme. Sixth, selecting a first relevant distribution of encoded data blocks, which would be obtained from the encoding process, over the communication resources of the designated set. Seventh, calculating an estimated transmission time for such a transmission. Eighth, repeating the distribution, encoding and calculating steps until an estimated transmission time has been established for each combination of coding scheme and relevant distribution of encoded data blocks.

By relevant distribution is meant that a communication resource having a high estimated transmission quality always shall transmit at least as many encoded data blocks of a particular encoded packet, as a communication resource having a lower estimated transmission quality. However, a relevant distribution may very well mean that no encoded data blocks at all are distributed on one or some of the resources, which are identified in the designated set. A relevant distribution may also imply that the designated set contains no more resources than what can be handled by the least competent party involved, transmitter or receiver respectively.

Ninth, selecting an encoded packet which, in combination with a certain distribution, is expected to minimise the transmission time for the payload information contained in the original packet. Tenth, transmitting this encoded packet over the designated set of resources, according to this distribution.

An arrangement according to the invention for communicating packet information in a digital telecommunications system comprises the following: a buffer means, for storing data blocks, that constitute a particular packet; an encoding means, for retrieving a packet from the buffer means and producing therefrom an encoded packet; a computing means, for (i) deriving quality measures for all currently available communication resources, (ii) determining a designated set of communication resources from those resources that are available, (iii) determining relevant distributions of encoded data blocks over the designated set of communication resources and (iv) calculating estimated transmission times for sending an encoded packet according to at least two different combinations of encoding and distribution; and a transmitting means, for sending an encoded packet to a receiving party, over at least one of the communication resources of the designated set of resources, according to a distribution, which in combination with a particular encoding, is expected to give the shortest transmission time for the encoded packet.

According to an aspect of the present invention there is provided a base station control unit for a radio telecommunications system, e.g. GPRS, which comprises the inventive arrangement.

According to another aspect of the present invention there is provided a switching unit in a packet switched telecommunications network comprising the inventive arrangement.

The arrangement according to the invention may, of course, also be comprised any other resource allocating unit in a mobile or stationary digital telecommunication system.

The present invention thus offers a solution to the problem of minimising the average transmission time for payload information in a telecommunications system by, for each packet, selecting a combination of a forward error correction coding scheme and a block distribution over the available communication resources, that minimises the estimated transmission time for the packet.

Given an accurate estimate, the transmission time for any piece of information will so, on average, be minimal.

Consequently, a radio communications system, which applies this method for packet communication across its air interface, will also utilise the air interface as efficiently as possible, since the method minimises the total amount of radio resources necessary per piece of information being communicated.

The proposed solution also ensures a reliable transmission of information in an environment, where the transmission conditions are unstable. Since, regardless of any possible variations in the transmission qualities of the individual communication resources, the currently most efficient combination of forward error correction coding scheme and block distribution over the available communication resources is always selected.

DESCRIPTION OF THE FIGURES

FIGS. 5a,b illustrate a first and a second per se known way of encoding and transmitting a packet via a single communication resource;

FIGS. 6a,b illustrate a first and a second per se known way of encoding and transmitting a packet via multiple communication resources;

The invention will now be described in further detail with help from the preferred embodiments and with reference to enclosed drawings.

PREFERRED EMBODIMENTS

Figure 1:
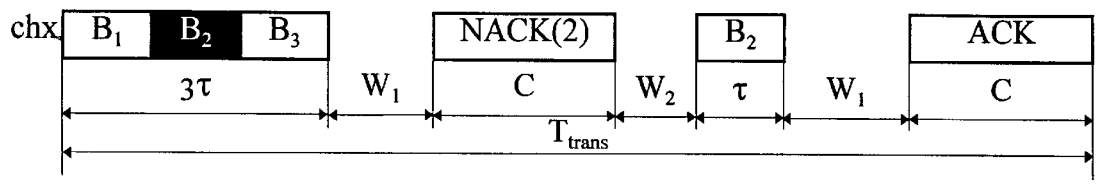
FIG. 1 illustrates a known method of transmitting a small packet via a single communication resource.

In FIG. 1 is illustrated a known method of communicating a small packet, comprising data blocks $B_1$–$B_3$, via a single communication resource chx, from a transmitting party to a receiving party in a digital telecommunications system, which operates according to a selective ARQ-protocol. In case the packet is erroneously received, the selective ARQ-protocol admits exclusive re-transmission of the particular data blocks in the packet, which were erroneously received. In the illustrated example a second data block $B_2$ in the packet was erroneously received. Hence, after a first waiting time $W_1$ the receiving party indicates this, by sending a negative acknowledgement message NACK(2) to the transmitting party. A second waiting time $W_2$ later, the second data block $B_2$ is re-transmitted and after another first waiting time $W_1$ the receiving party indicates correct reception of the second data block $B_2$, by returning a positive acknowledgement message ACK to the transmitting party. Given that the transfer of one data block requires a time T and that an acknowledgement message ACK, NACK has a transfer time C, the total transmission time $T_{trans}$ for the packet is $T_{trans} = 4\tau + 2W_1 + W_2 + 2C$.

Figure 2:
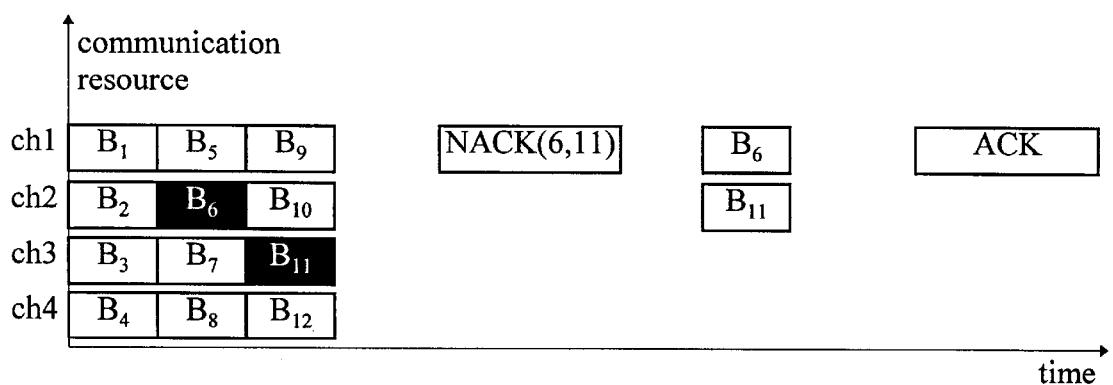
FIG. 2 illustrates a known method of transmitting a larger packet via multiple communication resources.

If larger packets are to be transmitted it is often efficient to utilise more than one communication resource. FIG. 2 illustrates a typical method of transmitting a packet, which comprises twelve data blocks $B_1$–$B_{12}$, over four communication resources ch1–ch4. The horizontal axis is a time axis and the contents of each communication resource ch1–ch4 is represented along the vertical axis. The communication resources ch1–ch4 are presumed to have equal transmission quality and the data blocks are evenly distributed over them. An even distribution of data blocks $B_1$–$B_{12}$ over the resources is most easily accomplished by allocating data blocks to the resources ch1–ch4 circularly, i.e. placing the first data block $B_1$ on the first communication resource ch1, the second data block $B_2$ on the second communication resource ch2 and so on. The data blocks $B_1$, $B_5$ and $B_9$ will thus be sent via the first resource ch1, data blocks $B_2$, $B_6$ and $B_{10}$ via the second ch2, data blocks $B_3$, $B_7$ and $B_{11}$ via the third ch3 and the data blocks $B_4$, $B_8$ and $B_{12}$ will be sent via the fourth communication resource ch4. During the transmission however, there occurs errors in the sixth data block $B_6$ and the eleventh data block $B_{11}$. The receiving party indicates this to the transmitting party, by sending a negative acknowledgement message NACK(6,11) in return. The erroneously received data blocks $B_6$ and $B_{11}$ are re-transmitted and this time they are both received correctly. Therefore, the receiving party returns a positive acknowledgement message ACK, which verifies that the entire packet now has been received correctly.

In the patent document SE, C2 504 577 is taught to selectively re-transmit erroneously received data blocks over those communication resources, which in previous transmissions have proved to have the highest transmission quality. A low number of erroneously received data blocks or rather a low proportion of erroneously received data blocks in relation to the total number of blocks sent via a particular resource is here considered to be an indication of a high transmission quality. According to said document it is therefore advisable to re-transmit erroneously received data blocks over communication resources different from the resources, which were used for transmitting these data blocks initially and instead use available communication resources, whose transmission quality is estimated to be higher.

Figure 3:
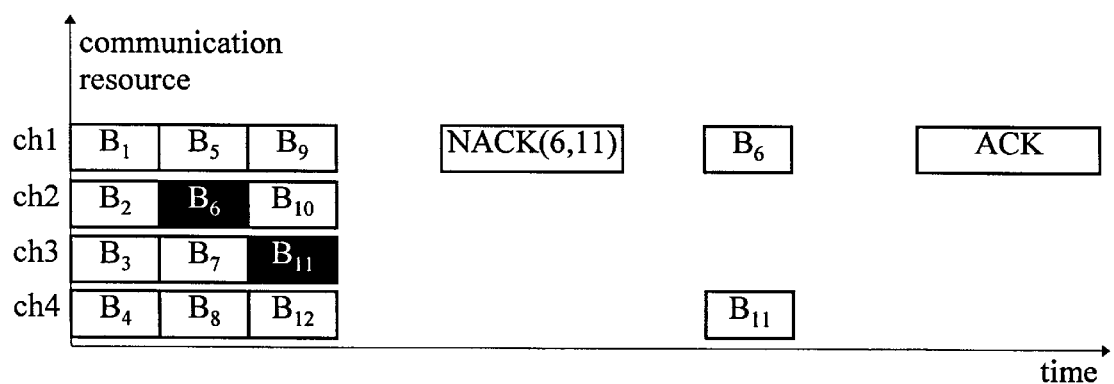
FIG. 3 illustrates a known alternative method of transmitting a larger packet via multiple communication resources.
Figure 4:
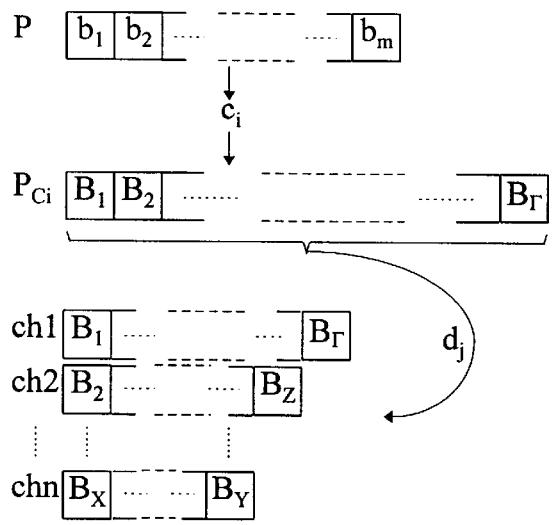
FIG. 4 illustrates how a packet is encoded and distributed over a multiplicity of communication resources, according to the inventive method.

In FIG. 3 is illustrated an alternative method of transmitting the packet referred to in FIG. 2, over the same four communication resources ch1–ch4. The resources ch1–ch4 are also here initially presumed to have equal transmission quality. However, the occurrence of transmission errors in sixth data block $B_6$ and the eleventh data block $B_{11}$ is now interpreted as a consequence of the second ch2 and third ch3 communication resource having a lower transmission quality than the first ch1 and the fourth ch4 communication resources. In order to reduce the probability of having repeated transmission errors in the erroneously received data blocks $B_6$ and $B_{11}$, these data blocks are instead re-transmitted over the first ch1 and the fourth ch4 communication resource respectively. Although the communication resources allocated for the re-transmission ch1; ch4 are changed, the coding scheme applied to the payload information is fixed, i.e. the exact same encoded data blocks $B_6$ and $B_{11}$ are sent once more to the receiving party. In order to reduce the number of data block re-transmissions it is well known in the art to include an amount of redundancy in each of a packet's data blocks. This redundancy is derived from the packet's payload information and is utilised by the receiving party to correct up to a certain number of errors in each specific data block. Such redundancy is added to a packet P by FEC-encoding the packet P via a coding scheme $c_i$. As a result of the FEC-encoding is obtained an encoded packet $P_{Ci}$. This process, plus a general distribution of encoded data blocks $B_1$–$B_\Gamma$ over a set of communication resources ch1–chn, is illustrated in FIG. 4.

The more redundancy that is included in a packet, the more transmission deterioration can be tolerated. However, the size of a data block is regularly constant. Thus, an encoded packet $P_{Ci}$ always comprises more data blocks than its non-encoded correspondence P. An original packet P, constituted by data blocks $b_1$–$b_m$ is here FEC-encoded, via a coding scheme $c_i$, into an encoded packet $P_{Ci}$, comprising encoded data blocks $B_1$–$B_\Gamma$, where $\Gamma > m$. The encoded data blocks $B$–$B_\Gamma$ are then distributed, according to a specific distribution $d_j$, over the set of communication resources ch1–chn and transmitted to a receiving party, where the information contained in the packet P is recreated.

Coding rate R is defined as the ratio between the number of payload data bits $n_{PL}$ and the number of coded bits $n_c$ (i.e. total number of bits—information bits plus added redundancy bits) in each data block, $R = n_{PL}/n_C$. Block Error Probability Rate BLER is defined as the probability of having at least one transmission error in a data block. Given a communication resource, with a certain transmission quality, the Block Error Probability Rate BLER increases if the coding rate R is increased. High Block Error Probability Rate BLER may give a long transmission time for a packet due to numerous block re-transmissions. A low coding rate R, on the other hand, gives many encoded data blocks, which always requires a certain minimal time to transfer. Consequently, finding a coding rate R, which for a specific set of available resources, gives the shortest transmission time for a given packet is an intricate optimisation problem. FIGS. 5a–b and 6a–b respectively elucidates this problem.

In FIG. 5a is illustrated how a packet is FEC-encoded, at coding rate $R=\frac{1}{2}$, into 24 encoded data blocks $B_1$–$B_{24}$. The encoded data blocks $B_1$–$B_{24}$ are communicated from a transmitting to a receiving party over one communication resource ch1. Due to the high degree of coding ($R=\frac{1}{2}$) no block errors occur during the transmission. The receiving party therefore returns a positive acknowledgement message ACK a first waiting time $W_1$ after having received the last encoded data block $B_{24}$ in the encoded packet. Postulated the transfer times as defined in connection with FIG. 1, the transmission time $T_{trans}$ for the encoded packet is $T_{trans} = 24\tau + W_1 + C$.

In FIG. 5b is illustrated how the same packet is FEC-encoded at a somewhat higher coding rate $R=\frac{3}{4}$. This gives 16 encoded data blocks $B_1$–$B_{16}$. The encoded data blocks $B_1$–$B_{16}$ are communicated from the transmitting to the receiving party over the same communication resource ch1. The weaker FEC-coding ($R=\frac{3}{4}$) applied in this case proves to be unable to correct transmission errors in two of the data blocks, $B_7$ and $B_{14}$. The erroneously received data blocks $B_7$; $B_{14}$ are indicated in a negative acknowledgement message NACK(7,14), which is returned from the receiving party a first waiting time $W_1$ after having received the last encoded data block $B_{16}$ in the encoded packet.

A second waiting time $W_2$ later the data blocks $B_7$; $B_{14}$ are re-transmitted and correctly received. Finally, a positive acknowledgement message ACK is sent from the receiving to the transmitting party. The total transmission time $T_{trans}$ for the encoded packet is in this case $T_{trans} = 18\tau + 2W_1 + W_2 + C$, which is shorter than in the previous case. Under the presumed conditions, the somewhat weaker FEC-coding in the latter case leads to a shorter transmission time $T_{trans}$ than the hard FEC-encoding utilised in the former case, although two data block re-transmissions are performed in the latter case. An example of the opposite relationship is shown in FIGS. 6a and 6b. FIG. 6a illustrates how the packet again is FEC-encoded, at coding rate $R=\frac{1}{2}$, into 24 encoded data blocks $B_1$–$B_{24}$. However, the encoded data blocks $B_1$–$B_{24}$ are now evenly distributed over four communication resources ch1–ch4, which are all presumed to have the same transmission quality, and communicated to the receiving party. The first communication resource ch1 transfers the encoded data blocks $B_1$, $B_5$, $B_9$, $B_{13}$, $B_{17}$ and $B_{21}$, the second ch2 the encoded data blocks $B_2$, $B_6$, $B_{10}$, $B_{14}$, $B_{18}$, and $B_{22}$, the third ch3 the encoded data blocks B3, $B_7$, $B_{11}$, $B_{15}$, $B_{19}$ and $B_{23}$ and finally, the fourth communication resource ch4 transfers the encoded data blocks $B_4$, $B_8$, $B_{12}$, $B_{16}$, $B_{20}$ and $B_{24}$. Since the transmission conditions from the previous cases still prevail, the $R=\frac{1}{2}$-encoding ensures that no unrecoverable block errors occur during the transmission. After reception of the last encoded data block $B_{24}$ the receiving party therefore returns a positive acknowledgement message ACK a first waiting time $W_1$ later. The transmission time $T_{trans}$ for the encoded packet is thus $T_{trans} = 6\tau + W_1 + C$.

FIG. 6b illustrates how the packet is FEC-encoded, at coding rate $R=\frac{3}{4}$, into 16 encoded data blocks $B_1$–$B_{16}$. These 16 encoded data blocks $B_1$–$B_{16}$ are likewise evenly distributed over the four communication resources ch1–ch4. The same block errors happen in the encoded data blocks $B_7$ and $B_{14}$. After the first waiting time $W_1$, the negative acknowledgement message NACK(7,14) is sent and the second waiting time $W_2$ later the erroneously received encoded data blocks $B_7$; $B_{14}$ are re-transmitted. In accordance with the teachings of SE, C2 504 577 the re-transmission takes place over the first ch1 and the fourth ch4 communication resource respectively. The transmission time $T_{trans}$ for the encoded packet here sums up to $T_{trans} = 5 + 2W_1 + W_2 + C$, which is a longer time than in the $R=\frac{1}{2}$-case above.

As can be seen from the examples illustrated in FIGS. 5a–b and 6a–b different choices of coding rate R give optimally short transmission times $T_{trans}$ depending on the amount of currently available communication resources. So far, we have initially presumed the same transmission quality for every available resource. This however, is not true in an actual telecommunications system, particularly not if the system is a radio communications system. Due to the inherent unstableness of the air interface in such a system, the transmission conditions vary dramatically, both between different communication resources at a given time and on a particular communication resource between different time instances.

Consequently, in order to calculate an adequate estimate of the transmission time $T_{trans}$ for a packet, a reasonable estimate of the present transmission quality for each of the available communication resources must be furnished. On basis of the estimated transmission quality estimated probabilities for having one, two, three, etc. re-transmissions of an encoded data block can be calculated. According to the invention, such probability calculations are preferably performed on beforehand for every coding rate R (i.e. FEC-coding scheme) at sampled estimated transmission quality measures and the results are stored in a look-up table. Hence, given an estimated transmission quality measure and a coding scheme, estimated probabilities for having zero, one, two or more re-transmissions of an encoded data block are readily at hand.

Figure 7:
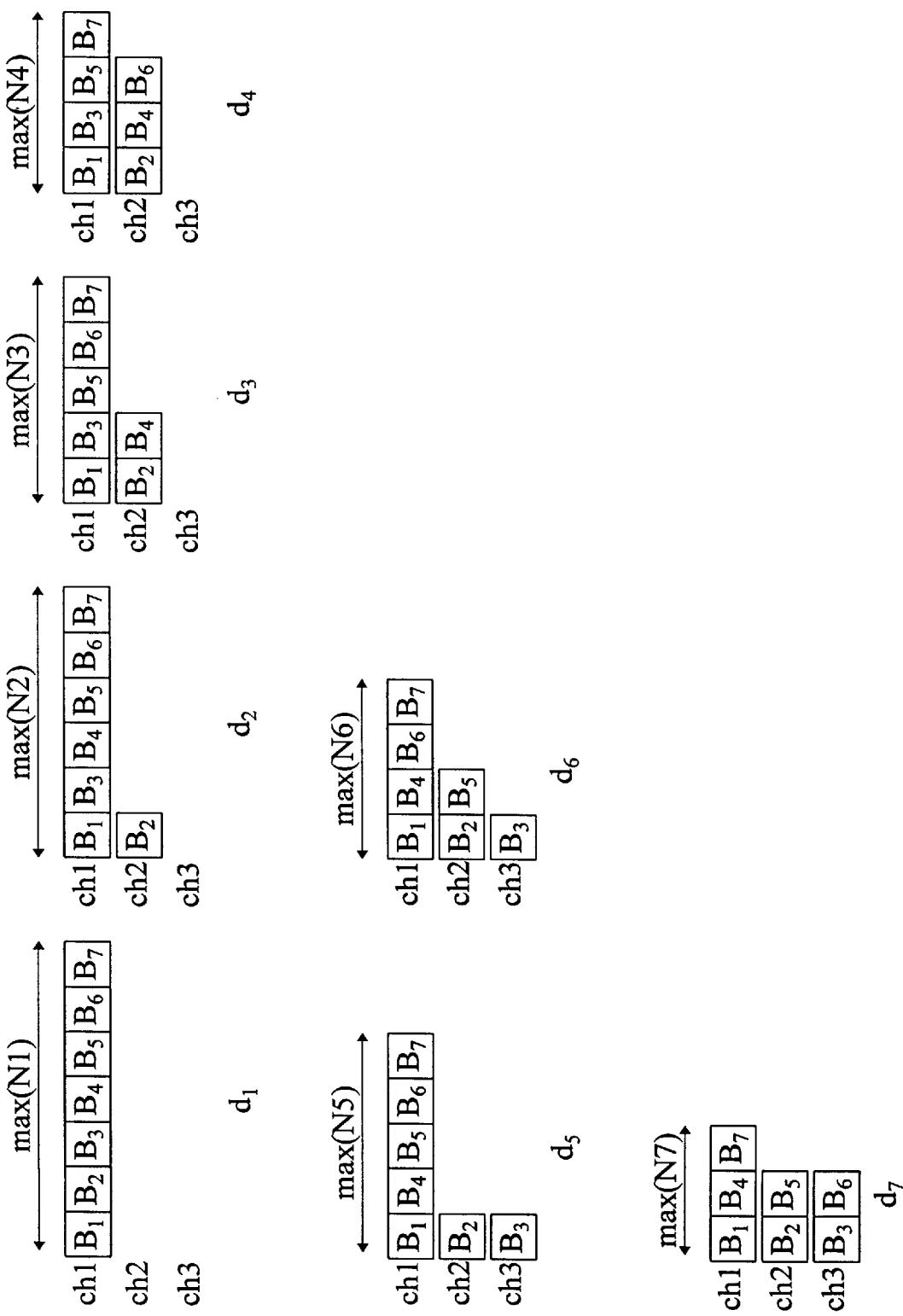
FIG. 7 illustrates seven relevant options as to distribute encoded data blocks of a particular packet over a given number of communication resources.

Depending on the variation between the estimated quality measures for the currently available communication resources, different distributions of encoded data blocks over the resources are optimal, from a transmission timepoint of view. In FIG. 7 is shown seven relevant distributions $d_1–d_7$ of encoded data blocks $B_1–B_7$ over three communication resources ch1–ch3. The communication resources ch1–ch3 are ranked in quality order, such that a first resource ch1, which has a highest estimated transmission quality measure $Q_1$ is ranked first, a second resource ch2, which has a second highest estimated transmission quality measure $Q_2$ is ranked second and a third communication resource ch3, which has a lowest estimated transmission quality measure $Q_3$ is ranked last. By a relevant distribution is meant a distribution, in which at least as many encoded data blocks are distributed on a communication resource, having a specific estimated transmission quality measure, as on a communication resource having a lower estimated transmission quality measure. The seven distributions $d_1–d_7$ depicted in FIG. 7 constitute all the relevant distributions of the seven encoded data blocks $B_1–B_7$ over the three communication resources ch1–ch3. In the first four distributions $d_1–d_4$, only a subset ch1; ch1–ch2 of the available set ch1–ch3 of communication resources is utilised. This kind of distribution is efficient if one or some of the available communication resources have a very poor estimated transmission quality measure $Q_2–Q_3$; $Q_3$. In the following three distributions $d_5–d_7$ every available communication resource is allocated for transmission of at least one encoded data block. A distribution of this sort is generally the most efficient for achieving a low transmission time for a packet, if there are no extreme differences between the estimated transmission quality measures for the available communication resources. Finally, in the last distribution $d_7$ the encoded data blocks $B_1–B_7$ are distributed as evenly as possible over the available resources ch1–ch3. In cases were it is important to minimise the initial delay for the transmission, i.e. when the first encoded data block must be sent as soon as possible, estimated transmission times $T_{trans}$ should at least be calculated for this distribution $d_7$ in combination with each coding scheme. This is motivated by that the minimal error free transmission time $T_{trans}^0$, which is primarily determined by the highest number of data blocks distributed on a single communication resource max(N7), is shortest for this distribution $d_7$. The minimal error free transmission time $T_{trans}^0$ for a distribution $d_i$ is more precisely equal to the highest number of data blocks distributed on a single communication resource max(Ni) multiplied with the time τ for transmitting a data block, plus the first waiting time $W_1$ and the time C, for transmitting a positive acknowledgement message ACK, i.e. $T_{trans}^0 = \max(Ni)\tau + W_1 + C$.

Naturally, the less communication resources a distribution $d_i$ encompasses the longer the minimal error free transmission time max(Ni) is. Provided that none of the available resources has a very poor transmission quality, minimising the minimal error free transmission time max(Ni) is a somewhat coarse, but at least a fairly apt way of achieving a short total transmission time $T_{trans}$ for an encoded packet. Referring to FIGS. 1, 5a–b, 6a–b and 7 a more adequate estimate of the transmission time $T_{trans}$ for an encoded packet $P_{ci}$ transmitted in a TDMA system can be obtained from the expression $$T_{trans} = \tau \sum_{L=1}^{Y} \max_i N_{i,L} + (Y-1)(W_1 + W_2 + C) + W_1 + C$$

where; τ is the time for transmitting one encoded data block of the encoded blocks $B_1–B_\Gamma$ in the encoded packet,
  Y is an estimated total number of transmissions demanded to transmit the entire encoded packet (derived from the estimated transmission quality measures $Q_1–Q_N$),
  $N_{i,L}$ is the number of encoded data blocks transmitted on communication resource i in the L:th transmission,
  $W_1$ is an expected waiting time between the last encoded data block in a transmission and reception at the transmitting party of an acknowledgement message ACK/NACK from the receiving party,
  $W_2$ is an expected time interval between reception of a negative acknowledgement message NACK and starting re-transmission of the erroneously received block (s),
  C is an estimated time for transmitting an acknowledgement message ACK/NACK.

An alternative way of estimating the transmission time $T_\Gamma$ for an encoded packet $P_{ci}$ transmitted in a TDMA system is to calculate the estimate iteratively through the algorithm $T_\Gamma(T_1, \ldots, T_{\Gamma-1}) =$ $$\begin{cases} \dfrac{\tau + W_1 + C + (1 - P_1(0))W_2}{1 - (1 - P_1(0))P_1(1)}, & \Gamma = 1 \\[2ex] \dfrac{\max(Ni)\tau + W_1 + C + (1 - P_\Gamma(0))\left(W_2 + \sum_{k=1}^{\Gamma-1} P_\Gamma(k)T_k\right)}{1 - (1 - P_\Gamma(0))P_\Gamma(\Gamma)}, & \Gamma > 1 \end{cases}$$

where; τ is the time for transmitting one encoded data block of the encoded data blocks $B_1–B_\Gamma$ in the encoded packet,
  C is the time for transmitting an acknowledgement message ACK/NACK,
  $W_1$ is an expected waiting time between the last encoded data block in a transmission and reception at the transmitting party of an acknowledgement message ACK/NACK from the receiving party,
  $W_2$ is an expected time interval between reception of a negative acknowledgement message NACK and starting re-transmission of the erroneously received data block(s),
  Γ is the number of encoded data blocks $B_1–B_\Gamma$ in the encoded packet,
  $P_\Gamma(k)$ is an estimated probability for having z re-transmissions, given that the entire encoded packet comprises Γ encoded data blocks $B_1–B_\Gamma$, and
  $\max(N_{i,L})$ is the largest number of encoded data blocks transmitted on communication resource i in the L:th transmission.

Figure 8:
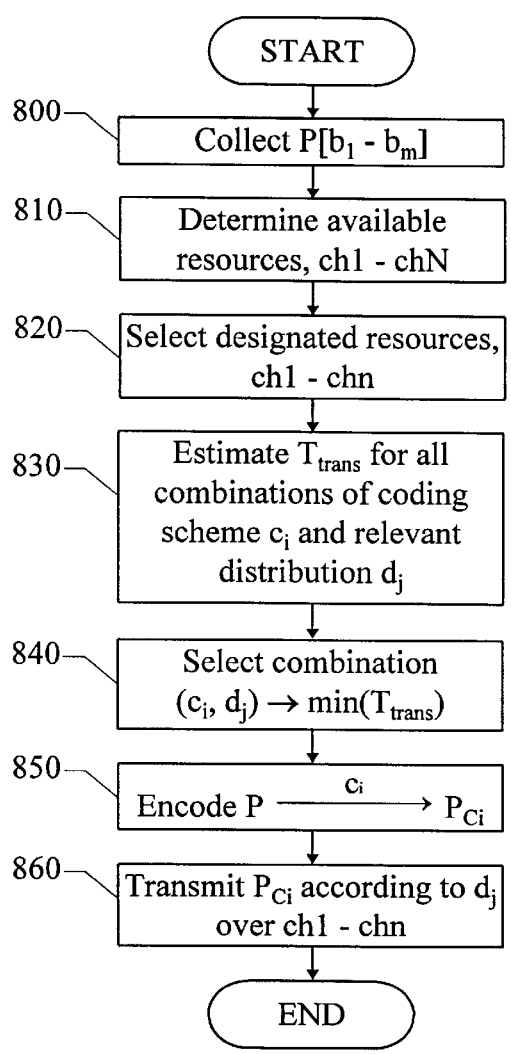
FIG. 8 shows a flow diagram over a first embodiment of the method according to the invention.

FIG. 8 shows a flow diagram over a first embodiment of the method according to the invention. Data blocks $b_1–b_m$, constituting a packet P, are collected in a first step 800 and in a second step 810 is determined which communication resources ch1–chN that currently are available. In the following step 820, a subset of designated communication resources ch1–chn is selected from the available resources ch1–chN. The designated communication resources ch1–chn may be selected on a variety of grounds. At least the choice is based upon an estimated transmission quality measure for each of the available communication resources ch1–chN. However, the designated set of communication resources ch1–chn should never comprise more communication resources, than what is given by the maximal transmission capacity of the parties involved in a particular transmission of information. If the maximal transmission capacity at the transmitting party is lower than the maximal reception capacity at the receiving party, then the amount of communication resources ch1–chn is determined by the capacity at the transmitting party, and if the maximal reception capacity at the receiving party is lower than the maximal transmission capacity at the transmitting party, then the amount of communication resources ch1–chn is determined by capacity at the receiving party.

Figure 9:
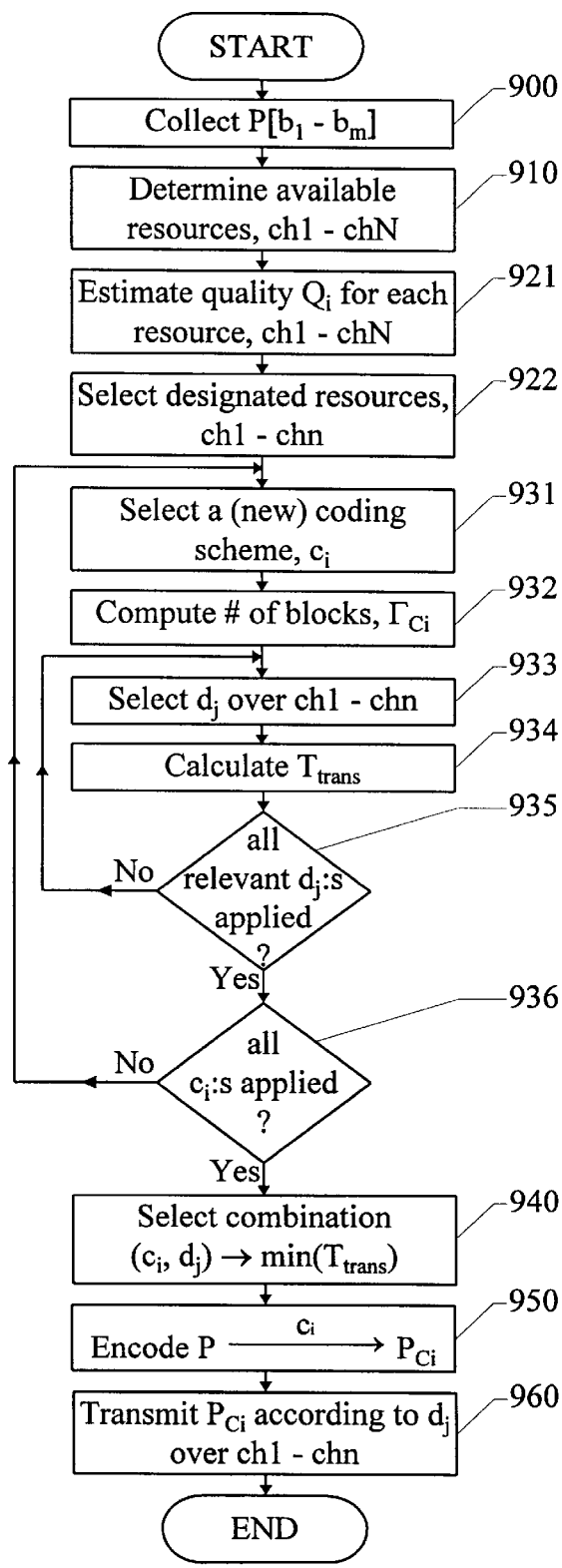
FIG. 9 shows a flow diagram over a second embodiment of the method according to the invention.

In a fourth step 830, is calculated a transmission time $T_{trans}$ for all combinations of coding scheme $c_i$ and relevant distribution $d_j$ of the encoded data blocks over the designated set of resources ch1–chn. In next step 840, is selected a combination $(c_i, d_j)$ of a coding scheme ci and a distribution $d_j$, which corresponds to the shortest estimated transmission time min($T_{trans}$). Succeeding step 850, implies encoding of the packet P into an encoded packet $P_{Ci}$, via the a coding scheme $c_i$ of the selected a combination $(c_i, d_j)$. Finally, in step a last 860, the encoded packet $P_{ci}$ is communicated from the transmitting party to the receiving party over the set of designated communication resources ch1–chn, in accordance with the distribution $d_j$ of the selected combination $(c_i, d_j)$. flow diagram over a second embodiment of the method according o the invention is shown in FIG. 9. In a first step 900, data locks $b_1$–$b_m$ constituting a packet P are collected. A second step 910, determines which communication resources ch1–chN that currently are available and in a third step 921, a transmission quality measure $Q_i$ is estimated for each of the available communication resources ch1–chN. In the following step 922, a subset of designated communication resources ch1–chn is selected from the available communication resources ch1–chN. The selection is i.a. based upon the estimated quality measures $Q_i$:s. An arbitrary coding scheme $c_i$ is selected in a subsequent step 931, and in a step 932 after that, is computed a number $\Gamma_{Ci}$ of data blocks, that would be the result if the packet P was encoded via the coding scheme $c_i$. Then, a relevant distribution $d_j$ of encoded data blocks, over the set of designated communication resources ch1–chn, is selected in step 933. Subsequently, in a step 934, an estimated transmission time $T_{trans}$ for the packet P, encoded via the coding scheme $c_i$, is calculated. In a following step 935, is inquired whether all relevant distributions $d_j$: s have been applied, and if so the procedure continues to a step 936; otherwise the procedure returns to the step 933, where a relevant distribution $d_{j+1}$, different from previously selected distribution(s) $d_j$, is selected. In the succeeding step 936, is inquired whether all coding schemes $c_i$:s have been applied, and if so the procedure continues to a step 940; if not, the procedure returns to the step 931, where a new coding scheme $c_{j+1}$ is selected. In the step 940, is selected a combination $(c_j, d_j)$ of a coding scheme $c_i$ and a distribution $d_j$, which corresponds to the shortest estimated transmission time min($T_{trans}$). Succeeding step 950, implies encoding of the packet P into an encoded packet $P_{Ci}$, via the a coding scheme $c_i$ of the selected a combination $(c_i, d_j)$. In a final step 960, is the encoded packet $P_{Ci}$ communicated from the transmitting party to the receiving party, over the set of designated communication resources ch1–chn, in accordance with the distribution $d_j$ of the selected combination $(c_i, d_j)$.

Figure 10:
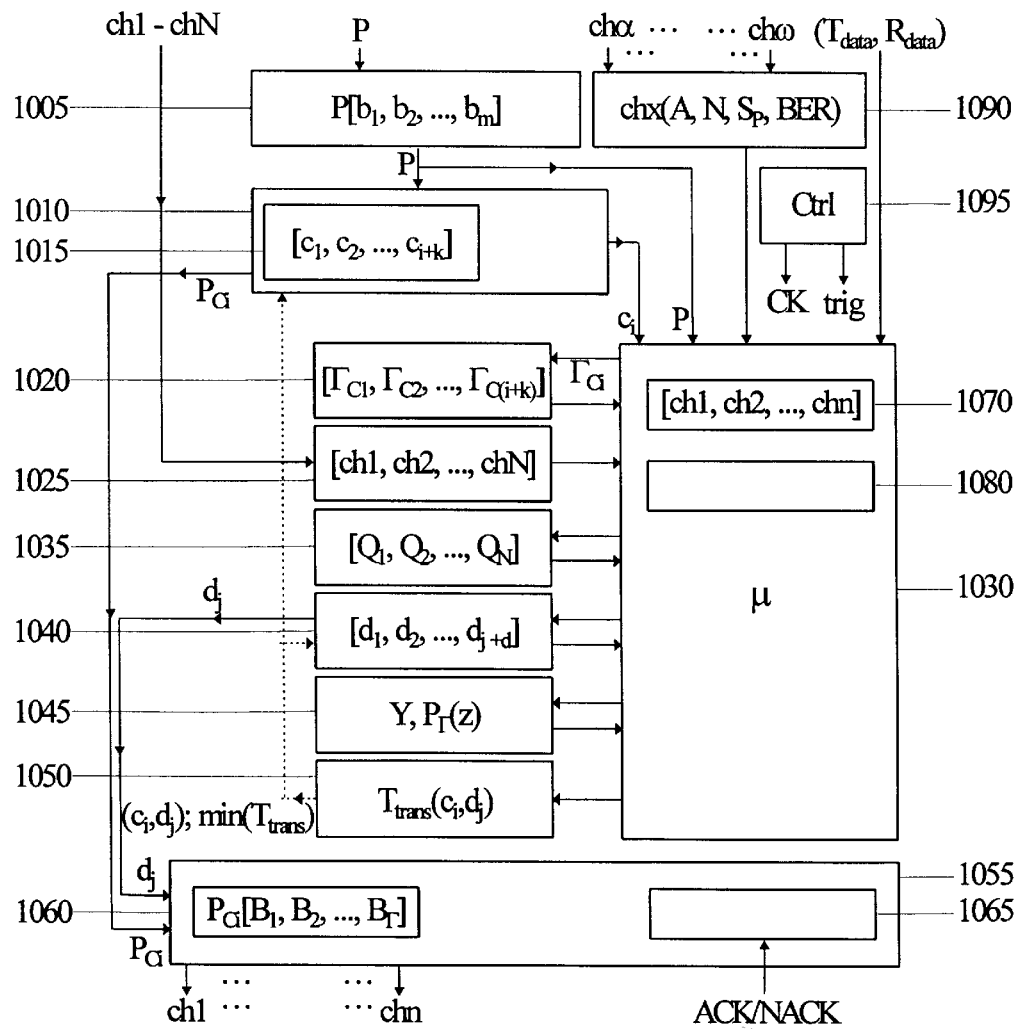
FIG. 10 depicts a block diagram over an arrangement according to the invention.

FIG. 10 depicts a block diagram over an arrangement according to the invention. The arrangement comprises a first buffer means 1005, for storing an incoming packet P; an encoding means 1010; a first storage means 1020, for holding FIGS. $\Gamma_{C1}, \Gamma_{C2}, \ldots, \Gamma_{C(i+k)}$, each representing a number of encoded data blocks, that would be the result if the packet P was FEC-encoded via each of at least two different coding schemes $c_1, C_2, \ldots, C_{(i+k)}$; a second storage means 1025, for holding an index over currently available communication resources ch1–chN; a third storage means 1035, for holding quality measures $Q_1$–$Q_N$ for each of the currently available communication resources ch1–chN; a fourth storage means 1040, for holding relevant distributions $d_1, d_2, \ldots, d_{j+d}$ of encoded data blocks $B_1$–$B_\Gamma$ over a designated set of communication resources; a fifth storage means 1045, for holding estimated numbers Y of total transmissions demanded to transmit packets $P_{Ci}$, encoded via each respective available coding scheme $c_i$, and/or estimated probabilities $P_\Gamma(z)$ for having specified numbers z of re-transmissions for a particular encoded packet $P_{Ci}$, comprising r encoded data blocks; a sixth storage means 1050, for collecting estimated transmission times $T_{trans}$, along with corresponding combinations $(c_i, d_j)$ of coding scheme $c_i$ and relevant distribution $d_j$; a transmitting means 1055, for communicating encoded packets $P_{ci}$:s from a transmitting party to a receiving party, according to a distribution $d_j$; a computing means 1030, for performing various calculations; a logging means 1090 for collecting and keeping statistics of events on all communication resources chα–chω within a digital telecommunications system and a control means 1095 for triggering and synchronising all other units comprised in the arrangement, through signals trig and CK respectively.

The arrangement operates as follows. A packet P, containing payload information and being constituted by data blocks $b_1, b_2, \ldots, b_m$, is stored in the first buffer means 1005. The packet P is then fed to the computing means 1030 along with a first coding scheme $c_1$ from the encoding means 1010. The computing means 1030 calculates a number $\Gamma_{C1}$ of data blocks, that would be the result if the packet P was encoded via the first coding scheme $c_1$. The number $\Gamma_{C1}$ is stored in the first storage means 1020. A corresponding number $\Gamma C_2$–$\Gamma_{C(i+k)}$ is also calculated and stored for at least one other coding scheme $c_2$–$c_{i+k}$. The encoding means 1010 must thus comprise a bank 1015 of two or more coding schemes $c_1, c_2, \ldots, C_{i+k}$. Each of the FIGS. $\Gamma_{C1}$–$\Gamma_{C(i+k)}$ is transferred, one at the time, to the computing means 1030 for calculation of estimated transmission times $T_{trans}$ for communicating the packet P, encoded via each of the respective coding schemes $c_1, c_2, \ldots, C_{i+k}$, according to different distributions $d_1$–$d_{j+d}$ of the encoded data blocks $B_1$–$B_\Gamma$, over the designated set of resources ch1–chn. Presently available communication resources ch1–chN are regularly sensed and an updated index over them is stored in the second storage means 1025. The contents of the second storage means 1025 is utilised by the computing means 1030 when determining for which resources a transmission quality measure $Q_i$ should be calculated. The results $Q_1, Q_2, \ldots, Q_N$ of these calculations are then stored in the third storage means 1035. Given the set of estimated transmission quality measures $Q_1$ $-Q_N$, current information from the logging means 1090 and data ($T_{data}$, $R_{data}$) regarding the capabilities of the transmitting and receiving party respectively, the calculating means 1030 determines a designated set of communication resources ch1–chn for the packet P, which preferably is stored in a memory means 1070 inside the computing means 1030. The information from the logging means 1090, for each communication resource chx contains, for instance, one or more of the parameters: a figure reflecting the number of positive acknowledgement messages A, a figure reflecting the number of negative acknowledgement messages N, a measured signal strength $S_p$ and an estimated BER (BER= Bit Error Rate). By applying estimated transmission quality measures $Q_1$–$Q_n$, for the communication resources ch1–chn in the designated set to a look-up table 1080, the calculating means 1030 derives estimated numbers Y of total transmissions demanded to transmit the packet P, encoded via each respective coding scheme $c_i$, and/or estimated probabilities $P_\Gamma(z)$ for having specified numbers z of re-transmissions for an encoded packet, comprising Γ encoded data blocks, when being transmitted over each of the resources ch1–chn in the designated set. The probabilities Y; $P_\Gamma(z)$ are stored in the fifth storage means 1045. On basis of the data in the storage means 1020–1045 the calculating means 1030 computes estimated transmission time $T_{trans}$ for each combination ($c_i$, $d_j$) of coding scheme $c_i$ and relevant distribution $d_j$, according to the inventive method, and stores the results in the sixth storage means 1050. The calculating means 1030 selects the lowest estimated transmission time $T_{trans}$, stored in the storage means 1050 and identifies a corresponding coding scheme $c_i$ and distribution $d_j$. Subsequently, the packet P is, via the identified coding scheme $c_i$, encoded into an encoded packet $P_{Ci}$, which is fed to the transmitting means 1055 along with the identified distribution $d_j$, from the fourth storage means 1040.

The transmitting means 1055 then communicates the encoded packet $P_{Ci}$, which comprises the encoded data blocks $B_1$, $B_2$, ..., $B_\Gamma$, to the receiving party over the resources ch1–chn in the designated set, according to the inventive method. The acknowledgement messages ACK; NACK, which are fed back from the receiving party are handled in a status receiving means 1065, preferably within the transmitting means 1055. In case of a negative acknowledgement message NACK, the erroneously received encoded data blocks, stated in the message, are re-transmitted in accordance with the inventive method; and if a positive acknowledgement message ACK is returned, the first buffer means 1005 may be reset and loaded with a new packet P.

What is claimed is:

1. A method for communicating packet information in a digital telecommunications system, wherein a variable amount of communication resources is available for each transmission of a packet between a transmitting party and a receiving party, wherein an erroneously received packet may be selectively re-transmitted and wherein the information is forward error correction encoded via one of at least two different coding schemes ($c_1$–$c_{i+k}$) prior to being communicated from the transmitting party to the receiving party, comprising the steps of:
   before a packet (P) is communicated, selecting a combination of a coding scheme ($c_i$) and a set of (n) designated communication resources (ch1–chn), at least on the basis of an estimated transmission time ($T_{trans}$, $T_\Gamma$) for an encoded packet ($P_{ci}$), which is constituted by a calculated number ($\Gamma_{ci}$) of encoded data blocks; and
   communicating the information from the transmitting party to the receiving party.

2. The method according to claim 1, wherein the coding scheme ($c_i$) is fixed during the entire transmission of the packet (P).

3. The method according to claim 1, wherein the estimated transmission time ($T_{trans}$, $T_\Gamma$) is calculated by taking into account an estimated total transmission delay, which is at least derived from an estimated number of data block re-transmissions during the transmission.

4. The method according to claim 3, wherein the estimated number of data block re-transmissions is calculated from an estimated transmission quality measure ($Q_1$–$Q_N$) for each of a currently available amount (N) communication resources (ch1–chN).

5. The method according to claim 4, wherein the transmission quality measure ($Q_1$–$Q_N$) is estimated from at least one of the:
   results of previous transmissions of information over the currently available amount of (N) communication resources (ch1–chN)
   estimated bit error rates (BER) for the currently available amount of (N) communication resources (ch1–chN), and
   measured signal strengths ($S_p$) for the currently available amount of (N) communication resources (ch1–chN).

6. A method for communicating packet information in a digital telecommunications system, wherein a variable amount of communication resources is available for each transmission of a packet between a transmitting party and a receiving party, wherein an erroneously received packet may be selectively re-transmitted and wherein the information is forward error correction encoded via one of at least two different coding schemes ($c_i$–$c_{i+k}$) prior to being communicated from the transmitting party to the receiving party, such that for each packet (P), the method comprising the steps of:
   determining an amount of (N) currently available communication resources (ch1–chN),
   selecting a set of (n) designated communication resources (ch1–chn),
   estimating a transmission time ($T_{trans}$, $T_\Gamma$) for at least two encoded packets $P_{ci}$), each comprising one or more encoded data blocks ($B_1$–$B_\Gamma$), and which is each derived from encoding the packet (P) via a particular coding scheme ($c_i$), for sending the respective encoded packet ($P_{ci}$) over the set of (n) designated communication resources (ch1–chn),
   selecting a combination of a coding scheme ($c_i$) and a distribution ($d_j$) of encoded data blocks ($B_1$–$B_\Gamma$), which represent the packet (P) encoded via the coding scheme ($c_i$), over the (n) designated communication resources (ch1–chn), that minimizes the estimated transmission time ($T_{trans}$, $T_\Gamma$) for the encoded data blocks ($B_1$–$B_\Gamma$),
   encoding the packet (P), according to the coding scheme ($c_i$), into an encoded packet ($P_{ci}$) comprising encoded data blocks ($B_1$–$B_\Gamma$), and
   transmitting the encoded data blocks ($B_1$–$B_\Gamma$) over the set of (n) designated communication resources (ch1–chn) in accordance with said distribution ($d_j$).

7. The method according to claim 6, wherein the estimated transmission time ($T_{trans}$, $T_\Gamma$) is calculated by taking into account an estimated total transmission delay, which is at least derived from an estimated number of data block re-transmissions during the transmission.

8. The method according to claim 7, wherein the estimated number of data block re-transmissions is calculated from an estimated transmission quality measure ($Q_1$–$Q_N$) for each of a currently available amount (N) communication resources (ch1–chN).

9. The method according to claim 8, wherein the transmission quality measure ($Q_1$–$Q_N$) is estimated from at least one of the:
   results of previous transmissions of information over the currently available amount of (N) communication resources (ch1–chN),
   estimated bit error rates (BER) for the currently available amount of (N) communication resources (ch1–chN), and
   measured signal strengths ($S_p$) for the currently available amount of (N) communication resources (ch1–chN).

10. A method for communicating packet information in a digital telecommunications system, wherein a variable amount of communication resources is available for each transmission of a packet between a transmitting party and a receiving party, wherein an erroneously received packet may be selectively re-transmitted and wherein the information is forward error correction encoded via one of at least two different coding schemes ($c_1$–$C_{i+k}$) prior to being communicated from the transmitting party to the receiving party, such that for each packet (P), the method comprising the steps of:
   determining an amount of (N) currently available communication resources (ch1–chN),
   estimating a transmission quality measure ($Q_1$–$Q_N$) for each of the (N) currently available communication resources (ch1–chN),
   selecting a designated set of (n) communication resources (ch1–chn) from the (N) currently available communication resources (ch1–chN),
   selecting a first coding scheme ($c_i$),
   computing a number ($\Gamma_{c1}$) of data blocks, that would be the result if the packet (P) was encoded via the first coding scheme $c_1$,
   selecting a first distribution ($d_1$) of the encoded data blocks ($B_1$–$B_\Gamma$) over the designated set of (n) communication resources (ch1–chn),
   calculating an estimated transmission time ($T_{trans}$, $T_\Gamma$) for transmitting the encoded data blocks ($B_1$–$B_\Gamma$), according to the selected combination of coding scheme ($c_1$) and distribution ($d_1$),
   repeating the two previous steps for possible alternative distributions ($d_2, \ldots, d_{j+d}$) until all relevant distributions ($d_1, d_2, \ldots, d_{i+d}$) have been applied,
   selecting a coding scheme ($c_2$), different from the previously selected coding scheme(s) ($c_1$), and repeating the previous four steps for this coding scheme ($c_2$),
   repeating the previous step until an estimated transmission time ($T_{trans}$) has been calculated for all combinations of coding scheme ($c_1$–$C_{i+k}$) and relevant distribution ($d_1$–$d_{j+d}$),
   selecting a combination of a coding scheme ($c_j$) and a distribution ($d_j$) of encoded data blocks ($B_1$–$B_\Gamma$), which represent the packet (P) encoded via the coding scheme ($c_j$), over the (n) designated communication resources (ch1–chn), that minimizes the estimated transmission time ($T_{trans}$, $T_\Gamma$) for the encoded data blocks ($B_1$–$B_\Gamma$),
   encoding the packet (P), according to the coding scheme ($c_j$), into an encoded packet ($P_{cj}$), comprising encoded data blocks ($B_1$–$B_\Gamma$), and
   transmitting the encoded data blocks ($B_1$–$B_\Gamma$) over the set of (n) designated communication resources (ch1–chn) in accordance with said distribution ($d_j$).

11. The method according to claim 10, wherein the designated set of (n) communication resources (ch1–chn) comprises at most an amount of resources, which is given by either of (i) the maximal transmission capacity at the transmitting party or (ii) the maximal reception capacity at the receiving party, whichever is lowest.

12. The method according to claim 10, wherein the designated set of (n) communication resources (ch1–chn) only comprises resources in which said transmission has a quality measure ($Q_1$–$Q_n$) higher or equal to a certain quality limit measure ($Q_L$).

13. The method according to claim 10, wherein the relevant distribution ($d_1$–$d_{j+d}$) is a distribution ($d_1$–$d_7$) in which at least as many encoded data blocks are distributed on a communication resource (ch1), having a specific estimated transmission quality measure ($Q_1$), as on a communication resource (ch1) having a lower ($Q_2<Q_1$) estimated transmission quality measure ($Q_2$).

14. The method according to claim 10, wherein all (n) communication resources (ch1–ch3) in the designated set are utilised in every relevant distribution ($d_5$–$d_7$).

15. The method according to claim 10, wherein the relevant distribution ($d_1$–$d_{j+d}$) is an as even as possible distribution ($d_7$) of the encoded data blocks ($B_1$–$B_7$).

16. The method according to claim 10, wherein the estimated transmission time ($T_{trans}$, $T_\Gamma$) is calculated by at least taking into account an estimated total transmission delay, which is derived from an estimated number of data block re-transmissions during the transmission.

17. The method according to claim 16, wherein the estimated number of data block re-transmissions is calculated from the estimated transmission quality measure ($Q_1$–$Q_N$) for each of the currently available amount (N) of communication resources (ch1–chN).

18. The method according to claim 10, wherein the estimated transmission time ($T_{trans}$) is calculated through the algorithm:

$$T_{trans} = \tau \sum_{L=1}^{Y} \max_i N_{i,L} + (Y-1)(W_1 + W_2 + C) + W_1 + C$$

where;
   $\tau$ is the time for transmitting one encoded data block of the encoded blocks $B_1$–$B_\Gamma$ in the encoded packet,
   Y is an estimated total number of transmissions demanded to transmit the entire encoded packet,
   $N_{i,L}$ is the number of encoded data blocks transmitted on communication resource i in the L:th transmission,
   $W_1$ is an expected waiting time between the last encoded data block in a transmission and reception at the transmitting party of an acknowledgement message ACK/NACK from the receiving party,
   $W_2$ is an expected time interval between reception of a negative acknowledgement message NACK and starting re-transmission of the erroneously received block (s), and
   C is an estimated time for transmitting an acknowledgement message ACK/NACK.

19. The method according to claim 10, wherein the estimated transmission time ($T_\Gamma$) is calculated through the algorithm:

$$T_\Gamma(T_1, \ldots, T_{\Gamma-1}) = \begin{cases} \dfrac{\tau + W_1 + C + (1 - P_1(0))W_2}{1 - (1 - P_1(0))P_1(1)}, & \Gamma = 1 \\[2em] \dfrac{\max(Ni)\tau + W_1 + C + (1 - P_\Gamma(0))\left(W_2 + \sum_{k=1}^{\Gamma-1} P_\Gamma(k)T_k\right)}{1 - (1 - P_\Gamma(0))P_\Gamma(\Gamma)}, & \Gamma > 1 \end{cases}$$

where;

$\tau$ is the time for transmitting one encoded data block of the encoded blocks $B_1$–$B_\Gamma$ in the encoded packet, C is the time for transmitting an acknowledgement message ACK/NACK, $W_1$ is an expected waiting time between the last encoded data block in a transmission and reception at the transmitting party of an acknowledgement message ACK/NACK from the receiving party, $W_2$ is an expected time interval between reception of a negative acknowledgement message NACK and starting re-transmission of the erroneously received data block(s), $\Gamma$ is the number of encoded data blocks $B_1$–$B_\Gamma$ in the encoded packet, $P_\Gamma(k)$ is an estimated probability for having z re-transmissions, given that the entire encoded packet comprises $\Gamma$ encoded data blocks $B_1$–$B_\Gamma$, and $\max(N_{i,L})$ is the largest number of encoded data blocks transmitted on communication resource i in the L:th transmission.

20. The method according to claim 10, wherein the transmission quality measure ($Q_1$–$Q_N$) is estimated from at least one of the:

results of previous transmissions of information over the currently available communication resources (ch1–chN), and measured signal strengths ($S_p$) for the (N) currently available communication resources (ch1–chN).

21. An apparatus for communicating packet information in a digital telecommunications system, said apparatus comprising:

a first buffer unit for storing data blocks ($b_1$–$b_m$), which constitute one packet (P), an encoding unit for retrieving a packet (P) from the first buffer unit and producing therefrom an encoded packet ($P_{ci}$) which comprises encoded data blocks ($B_1$–$B_\Gamma$), a computing unit for
  (i) deriving quality measures ($Q_1$–$Q_N$) for each communication resource (ch1–chN) of a currently available amount of resources,
  (ii) determining, from the currently available amount of resources, a designated set of communication resources (ch1–chn) for transmitting an encoded packet ($P_{ci}$),
  (iii) determining relevant distributions ($d_1$–$d_{j+d}$) of encoded data blocks ($B_1$–$B_\Gamma$) over the designated set of communication resources (ch1–chn), and
  (iv) calculating estimated transmission times ($T_{trans}$), for sending an encoded packet ($P_{ci}$), according to at least two different combinations of encoding ($c_i$) and distribution ($d_j$), and a transmitting unit for communicating an encoded packet ($P_{ci}$) to a receiving party, over at least one of the resources, comprised in the designated set of communication resources (ch1–chn), according to a distribution ($d_j$), which in combination with a particular encoding ($c_i$), give the shortest estimated transmission time ($T_{trans}$).

22. The apparatus according to claim 21, further comprising:

a logging unit for storing historical events and statistics (A, N, $S_p$, BER) on communication resources (ch$\alpha$–ch$\omega$), serving as a basis for the quality measures ($Q_1$–$Q_N$;) of the communication resource (ch$\alpha$–ch$\omega$), and a storage unit for holding figures representing the number of encoded data blocks in at least two different encoded versions ($P_{ci}$) of the packet (P), the quality measures ($Q_1$–$Q_N$;) and relevant distributions ($d_1$–$d_{j+d}$).

23. The apparatus according to claim 21, wherein:

the encoding unit comprises a bank of at least two different coding schemes ($c_1, c_2, \ldots, C_{i+k}$), and the transmitting unit comprises a second buffer unit, for storing an encoded packet ($P_{ci}$), and a status sensing unit, for determining the status of each sent encoded data block ($B_1$–$B_\Gamma$) at the receiving party.

24. The apparatus of claim 21, wherein the apparatus is integral to a base station control unit for a radio telecommunications system.

25. The apparatus of claim 21, wherein the apparatus is integral to a switching unit in a packet switched telecommunications network.

* * * * *

UNITED STATES PATENT AND TRADEMARK OFFICE
CERTIFICATE OF CORRECTION

PATENT NO. : 6,363,425 B1
DATED : March 26, 2002
INVENTOR(S) : Mikael Hook et al.

It is certified that error appears in the above-identified patent and that said Letters Patent is hereby corrected as shown below:

Column 8,
Lines 52-53, replace "Ttrans=5+ 2$W_1$+$W_2$+ C" with -- Ttrans = 5 $\tau$ + 2$W_1$ + $W_2$ + C, --

Column 11,
Line 36, replace "flow diagram" with -- A flow diagram --
Line 38, replace "data locks" with -- data blocks --

Column 13,
Line 58, replace "comprising the steps of" with -- said method comprising the steps of --

Column 15,
Line 32, replace "coding scheme (c,)," with -- coding scheme ($C_1$), --
Line 45, replace "($d_1$, $d_2$,....$d_{i+d}$)" with -- ($d_1$, $d_2$,....$d_{j+d}$) --

Signed and Sealed this

Tenth Day of December, 2002

JAMES E. ROGAN
*Director of the United States Patent and Trademark Office*